United States Patent
Niu et al.

(10) Patent No.: US 12,359,040 B2
(45) Date of Patent: Jul. 15, 2025

(54) VULCANIZING AGENT AND APPLICATION THEREOF

(71) Applicant: DALIAN UNIVERSITY OF TECHNOLOGY, Liaoning (CN)

(72) Inventors: Hui Niu, Liaoning (CN); Shiqi Xie, Liaoning (CN); Shuhui Liu, Liaoning (CN); Zongke He, Liaoning (CN); Zhuo Bao, Liaoning (CN); Liying Liu, Liaoning (CN); Zhe Hua, Liaoning (CN); Aihui Wang, Liaoning (CN); Wenjing Yin, Liaoning (CN); Jing Wang, Liaoning (CN); Xu Li, Liaoning (CN); Shuang Sun, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 485 days.

(21) Appl. No.: 17/758,285

(22) PCT Filed: Jan. 21, 2020

(86) PCT No.: PCT/CN2020/073464
§ 371 (c)(1),
(2) Date: Jun. 30, 2022

(87) PCT Pub. No.: WO2021/134854
PCT Pub. Date: Jul. 8, 2021

(65) Prior Publication Data
US 2023/0092694 A1   Mar. 23, 2023

(30) Foreign Application Priority Data
Dec. 31, 2019   (CN) .......................... 201911418530.7

(51) Int. Cl.
| C08K 5/3417 | (2006.01) |
| B29C 48/00 | (2019.01) |
| B29C 48/40 | (2019.01) |
| C08F 110/06 | (2006.01) |
| C08K 5/14 | (2006.01) |
| C08K 5/151 | (2006.01) |
| C08K 5/54 | (2006.01) |
| B29K 23/00 | (2006.01) |

(52) U.S. Cl.
CPC .......... *C08K 5/3417* (2013.01); *B29C 48/022* (2019.02); *B29C 48/40* (2019.02); *C08F 110/06* (2013.01); *C08K 5/14* (2013.01); *C08K 5/151* (2013.01); *C08K 5/5403* (2013.01); *B29C 2948/92704* (2019.02); *B29K 2023/12* (2013.01)

(58) Field of Classification Search
CPC ..... B29C 48/40; B29C 48/022; C08K 5/5403; C08K 5/3417; C08K 5/151; C08K 5/14; C08K 5/1345; C08K 5/526; C08L 23/12; C08L 23/16; C08L 23/06; C08L 23/22; C08F 110/06
See application file for complete search history.

(56) References Cited

U.S. PATENT DOCUMENTS

| 2013/0330292 | A1* | 12/2013 | Lei | A61K 8/731 |
| | | | | 424/70.17 |
| 2014/0329929 | A1* | 11/2014 | Moszner | C08F 122/22 |
| | | | | 549/28 |
| 2015/0252312 | A1* | 9/2015 | de Villeneuve | B01J 13/206 |
| | | | | 512/4 |
| 2017/0252274 | A1* | 9/2017 | Lei | A61K 8/84 |
| 2018/0015009 | A1* | 1/2018 | Soubiran | A61K 8/87 |
| 2018/0334467 | A1 | 11/2018 | Katayama et al. | |

FOREIGN PATENT DOCUMENTS

| CN | 102051041 A | 5/2011 |
| CN | 105294936 A | 2/2016 |
| CN | 105916916 A | 8/2016 |
| CN | 109293804 A | 2/2019 |
| JP | 2005232412 A | 9/2005 |
| JP | 2012197336 A | 10/2012 |
| JP | 6390562 B2 | 9/2018 |

OTHER PUBLICATIONS

Moszner, Polymer Bulletin 39, 669-676 (1997) (Year: 1997).*
Moszner, Norbert et al.; "Monomers for adhesive polymers"; Polymer Bulletin; vol. 39, Oct. 13, 1997; pp. 669-676.
Zhang Ming-Qiu et al.; "Intrinsic Self-healing and Solid-state Recycling of Vulcanized Natural Rubber"; Acta Polymerica Sinica, vol. 7, Jul. 2017, pp. 1130-1140.

* cited by examiner

*Primary Examiner* — Robert C Boyle
(74) *Attorney, Agent, or Firm* — NKL Law; Allen Xue (57) ABSTRACT

A vulcanizing agent is added during the processing of a polymer, and can form a crosslinking structure network in the polymer, thereby improving the mechanical properties of the material. Furthermore, the crosslinking agent can also de-crosslink the polymer material at a high temperature, and after being cooled, same can be crosslinked again to produce a network structure, thus endowing the polymer material with thermoplasticity for repeated processing.

8 Claims, 1 Drawing Sheet

VULCANIZING AGENT AND APPLICATION THEREOF

TECHNICAL FIELD

The present disclosure relates to the technical field of polymer vulcanizing agent, in particular to a vulcanizing agent and application thereof, especially to a vulcanizing agent having reversible crosslinking function and its application in polymers.

BACKGROUND

Vulcanization is an important means of crosslinking polymers. Three-dimensional network structure formed by vulcanization of polymers can enable polymer materials to have higher strength, temperature stability and chemical stress cracking resistance performance, etc., in particular to rubber polymer materials. Only through crosslinking modification can rubber polymer materials have the required elasticity, resilience, strength and dimensional stability during application process. Sulfur vulcanization is the first rubber crosslinking process discovered by human beings. The vulcanization greatly improves the physical and chemical properties of rubber products. After nearly 200 years of development, vulcanization process has developed such methods as peroxide vulcanization, ray irradiation vulcanization and functional group vulcanization. However, sulfur vulcanization is still the most economical method due to cheap raw materials. By adding vulcanization accelerators and activators into the sulfur vulcanization system, it can further reduce the amount of sulfur, shorten the vulcanization time and decrease the vulcanization temperature. Vulcanization of organic peroxides is to trigger free radical reaction between polymer molecules through free radicals generated by hemolysis of compounds containing one or more peroxy bonds (—O—O—) in the structure, thus producing a crosslinking network structure. Peroxide crosslinking can be carried out in saturated polymers (usually more than 2 wt. % peroxide needs to be added to the polymer), which overcomes the problem that saturated polymers (such as ethylene propylene rubber) are difficult to vulcanize with sulfur. Irradiation vulcanization is a technology that crosslinks polymer molecules with high-energy rays, which can avoid adding sulfides including peroxide and sulfur. Its basic principle is that when high-energy rays pass through the polymer substrate, the polymer molecules are activated to produce free radicals, and then these free radicals combine with each other to form a crosslinking network. In addition, crosslinking also can be carried out by introduction of reactive groups in the side groups of polymers. Vinyl siloxane is a mild and efficient functional monomer commonly used in crosslinking polyolefins, which can be crosslinked in the presence of water to obtain highly crosslinking materials. Using diolefin vulcanizing agent (such as divinylbenzene) to directly crosslink the polymer is also one of the vulcanization methods, which is mostly used for the crosslinking modification of polyolefin resin.

As the main crosslinking technology of polymer materials at present, the crosslinking covalent bond formed by vulcanization crosslinking is irreversible so that the crosslinking polymer unable to be reprocessed. Therefore, while giving the material excellent properties, vulcanization crosslinking also brings problems including the recycle of polymer materials. Under this background, rubber desulfurization and recycle technology came into being, and has been applied in the recycle of polymer rubbers including natural rubbers and butyl rubbers. Zhang Mingqiu et al. have done a lot of work in the recycle of vulcanized natural rubber, and found that a solid-phase recycle of vulcanized natural rubber can be achieved by means of the dynamic exchange reversible reaction of disulfide bonds in the crosslinking rubber (Acta Polymerica Sinica, 2017, 71130-1140). They made the crosslinking network have a dynamic characteristic by adding copper methacrylate (MA—Cu) or copper chloride ($CuCl_2$) to the rubber as the catalyst for disulfide bond exchange reaction, thus made the vulcanized natural rubber realize recycle and reprocessing at a temperature higher than 120° C. This method provides a recycle solution for a large number of existing vulcanized natural rubber products and has long-term social meaning. However, the more stable C—C bond produced by methods including peroxide crosslinking, irradiation crosslinking, silane crosslinking and divinylbenzene crosslinking makes the desulfurization (de-crosslinking) of the polymers more difficult. A combination of heat treatment and mechanical treatment is usually used to destroy the vulcanization crosslinking bond, but this process will cause fracture of the polymer main chain, and only 25% of the products obtained after desulfurization can be recycled.

It is the common goal pursued by researchers and industry to realize the recycle of crosslinking polymers. It not only has important economic benefits, but also has long-term social benefits. However, in general, current technology is still concentrated in the desulfurization, and the crosslinking method has not been reversibly designed from the source of vulcanization crosslinking. If a new vulcanizing agent can be designed to make crosslinking polymer have characteristics of de-crosslinking at a high temperature and re-crosslinking after being cooled, it will enable the material to be processed repeatedly, thus fundamentally solve the problem that the crosslinking polymer cannot be recycled.

SUMMARY OF THE INVENTION

It is an object of the present invention to provide a new vulcanizing agent. The vulcanizing agent has at least two α-olefin structures, which is a product of the [4+2] cycloaddition reaction. The vulcanizing agent includes a structure selected from any one of formulas (I) to (VI):

(I)

(II)

(III)

-continued (IV)

(V)

(VI)

In the formulas, $R^1$ and $R^2$ are the same or different, and each of $R^1$ and $R^2$ is selected from acrylate groups, styryl, vinyl silane groups, and substitutes of acrylate groups, styryl and vinyl silane groups that contain 1 to 12 carbon atoms substituent group; $R^3$ and $R^4$ are the same or different, and each of $R^3$ and $R^3$ is selected from —O—, or —NH—, or —N(CH$_3$)—, and —N(C$_2$H$_5$)—; $R^5$ is selected from aliphatic groups, aromatic groups, ester groups, and ether groups, wherein, in case that $R^5$ is selected from aliphatic groups, the formula (I) or formula (II) can be represented as —C$_m$H$_{2m}$—, and the formula (IV) or formula (V) can be represented as (when n is 3) or (when n is 4);

in case that $R^5$ is selected from aromatic groups, the formula (I) or formula (II) can be represented as —(C$_6$H$_4$)$_x$C$_m$H$_{2m}$—, and the formula (IV) or formula (V) can be represented as (when n is 3) or (when n is 4);

in case that $R^5$ is selected from ester groups, the formula (I) or formula (II) can be represented as —(C$_6$H$_4$)$_y$(C$_m$H$_{2m}$)(COO)$_x$—, and the formula (IV) or formula (V) can be represented as (when n is 3) or (when n is 4);

in case that $R^5$ is selected from ether groups, the formula (I) or formula (II) can be represented as —(C$_6$H$_4$)$_y$C$_m$H$_{2m}$O$_x$—, and the formula (IV) or formula (V) can be represented as (when n is 3) or (when n is 4).

Furthermore, in the formulas, m is an integer ranging from 1 to 18, x is an integer ranging from 1 to 8, and y is an integer ranging from 1 to 8; $R^6$ and $R^7$ are the same or different, and each of $R^6$ and $R^7$ is selected from —H and —CH$_3$; and n is 3 or 4.

The structure of formula (I) in the present disclosure is directly prepared by Diels-Alder reaction ([4+2] cycloaddition reaction) of reacting bismaleimide with substituted furan or substituted pyrrole, or is obtained by modifying the substituents after the Diels-Alder reaction of reacting bismaleimide with substituted furan or substituted pyrrole.

The structure of formula (II) in the present disclosure is directly prepared by Diels-Alder reaction of reacting diene with substituted furan or substituted pyrrole, or obtained by modifying the substituents after the Diels-Alder reaction of reacting diene with substituted furan or substituted pyrrole.

The structure of formula (III) in the present disclosure is prepared by dimerization of cyclopentadiene compound substituted with alkenyl groups through Diels-Alder reaction, or obtained by modifying the substituents after the dimerization of cyclopentadiene compound substituted with alkenyl groups through Diels-Alder reaction.

The structure of formula (IV) in the present disclosure is prepared by Diels-Alder reaction of reacting trimaleimide or tetramaleimide with alkenyl substituted furan or alkenyl substituted pyrrole, or obtained by modifying the substituents after the Diels-Alder reaction of reacting trimaleimide or tetramaleimide with alkenyl substituted furan or alkenyl substituted pyrrole.

The structure of formula (V) in the present disclosure is prepared by Diels-Alder reaction of reacting triene or tetraene with alkenyl substituted furan or alkenyl substituted pyrrole, or obtained by modifying the substituents after the Diels-Alder reaction of reacting triene or tetraene with alkenyl substituted furan or alkenyl substituted pyrrole.

The structure of the formula (VI) in the present disclosure is directly prepared by Diels-Alder reaction of reacting substituted maleimide with substituted furan or substituted pyrrole, or obtained by modifying the substituents after the Diels-Alder reaction of reacting substituted maleimide with substituted furan or substituted pyrrole.

The present disclosure further provides an application of the new vulcanizing agent for polymer vulcanization crosslinking. The polymer vulcanization crosslinking is carried out by react a polymer with a vulcanizing agent, an initiator and a heat stabilizer by means of melting method. The mass ratio of the polymer to the vulcanizing agent is 100:0.01 to 100:10, and the mass ratio of the polymer to the initiator is 100:0.01 to 100:1. A heat stabilizer can also be added, and the mass ratio of the polymer to the heat stabilizer is 100:0 to 100:1. The amount of the heat stabilizer can be 0.

The polymer is selected from at least one of polyolefin resins and polyolefin rubbers.

Preferably, the mass ratio of the polymer to the vulcanizing agent is 100:0.01 to 100:5, the mass ratio of the polymer to the initiator is 100:0.01 to 100:0.5, and the mass ratio of the polymer to the heat stabilizer is 100:0.1 to 100:0.5.

Preferably, the initiator is selected from organic peroxides and azo initiators.

More preferably, the organic peroxide is cyclohexanone peroxide, dicumyl peroxide, dibenzoyl peroxide, tert-butyl hydroperoxide, or 2,5-dimethyl-2,5-bis(tert-butyl peroxy) hexane.

More preferably, the azo initiator is azobisisobutyronitrile or azobisisoheptanenitrile.

Preferably, the heat stabilizer is selected from at least one of hindered phenolic macromolecular antioxidants, phosphite antioxidants and alkyl ester antioxidants.

More preferably, the heat stabilizer is a combination of hindered phenolic macromolecular antioxidants and phosphite antioxidants.

Most preferably, the heat stabilizer is antioxidant 1010 [pentaerythritol tetrakis (3-(3,5-di-tert-butyl-4-hydroxyphenyl)propionate)] and antioxidant 168 (tris [2,4-di-tert-butylphenyl] phosphite ester). Preferably, the mass ratio of the antioxidant 1010 to the antioxidant 168 is 1:0.5 to 1:2.

Preferably, the polymer is selected from at least one of saturated polyolefin resins and saturated polyolefin rubbers.

More preferably, the polyolefin resin is selected from homopolymers such as polyethylene, polypropylene and poly 1-butene, and copolymer resins thereof.

More preferably, the polyolefin rubber is selected from ethylene propylene rubber, ethylene/advanced α-olefin copolymer elastomer, butyl rubber, and styrene/isobutene copolymer rubber, etc.

Preferably, the polymer vulcanization crosslinking method includes the following steps of:

S1. mixing the polymer, the vulcanizing agent, the initiator and the heat stabilizer to obtain a premixed raw material;

S2. adding the premixed raw material into a reactive processing equipment to react at a temperature above 120° C.;

S3. extruding a product followed by cooling to crosslink.

Preferably, the reactive processing equipment adopted in the method is any one of single-screw extruder, twin-screw extruder, open mill and internal mixer.

When the vulcanizing agent is solid, it can be dissolved with a solvent and then mix with the polymer evenly. The used solvent is usually acetone or ethanol, etc., which is volatile and does not react with the vulcanizing agent or polymer. The solvent can be removed by natural volatilization.

The new vulcanizing agent described in the present disclosure is a compound having reversible covalent bonds. The functional group in the molecule of the vulcanizing agent can be decomposed into two parts by reverse Diels-Alder reaction (reverse [4+2] cycloaddition reaction) at a high-temperature (100 to 200° C., the temperature varies according to the structure); and at a low-temperature (0 to 120° C., the temperature varies according to the structure), the two parts can be recombined to form the original functional group through Diels-Alder reaction ([4+2] cycloaddition reaction). That is, vulcanizing agent has a characteristic of thermally reversible reaction.

Two or more double bonds of the molecular end groups of the new vulcanizing agent can chemically crosslink the polymers in the presence of the initiator to form a network structure, thereby realizing the reinforcement of the polymer. Meanwhile, the thermal reversibility of Diels-Alder reaction can realize the de-crosslinking of the material when the polymer is heated, so that enables the material to have thermoplasticity; and after cooling, the material can be crosslinked again to form a network structure, thus enables the material to have reprocessability and recyclability.

The present disclosure provides an application of the vulcanizing agent in recyclable crosslinking polymer materials.

DETAILED DESCRIPTION OF DRAWINGS

FIGS. 1A-1C show the crosslinking rubber product prepared in Embodiment 4, which is hot-pressed moulding again after being cut into fragments, wherein

DETAILED DESCRIPTION OF PREFERRED EMBODIMENTS

The following non-limiting embodiments can enable those ordinary in the art to understand the present disclosure more comprehensively, but do not limit the present disclosure in any way.

Embodiment 1

Preparation of New Vulcanizing Agent
1. Vulcanizing agent having the structure of formula (I)
Structural formula of the vulcanizing agent A:

The synthesis method is shown as chemical equation 1.

Synthesis of reactant-1: Furfuryl alcohol (6.43 g, 0.07 mol) was added into 20 mL of aqueous sodium hydroxide (40 wt. %) to react with stirring for 1 hour, and a reaction solution was obtained. Then, 10 mL of toluene, 5 g of 4-vinylbenzyl chloride and 4.25 g of aqueous tetrabutylammonium hydroxide (40 wt. %) were added into the reaction solution as catalysts to react for 48 hours at room temperature. After completion of the reaction, the reaction solution was added with excess water and extracted with ether. The organic phase was dried with anhydrous magnesium sulfate followed by filtration, and then the organic solvent was removed by rotary evaporation to obtain the reactant-1, with a yield of 76%.

The reactant-2 of N,N'-(4,4'-methylene diphenyl) bismaleimide (CAS No.: 13676-54-5) was purchased from Energy Chemical Limited Company.

Synthesis of vulcanizing agent A: the reactant-1 (8.00 g, 0.04 mol) and the reactant-2 (7.14 g, 0.02 mol) were dissolved in 50 mL of tetrahydrofuran to react at 60° C. for 24 hours under nitrogen. After completion of the reaction, the reaction solution was cooled to room temperature and then was added into excess ether to extract the organic phase. The organic phase was subjected to reduced pressure distillation to remove the solvent. The obtained viscous liquid was the vulcanizing agent A.

Chemical equation 1: synthesis route of vulcanizing agent A

2. Vulcanizing agent having the structure of formula (II)

Structural formula of the vulcanizing agent B:

The synthesis method is shown as chemical equation 2.

The reactant-1 of furfuryl alcohol (CAS No.: 98-00-0) was purchased from Energy Chemical Limited Company.

The reactant-2 of 1,4-butanediol diacrylate (CAS No.: 13676-54-5) was purchased from Energy Chemical Limited Company.

Synthesis of vulcanizing agent B: the reactant-1 (3.92 g, 0.04 mol) and the reactant-2 (3.96 g, 0.02 mol) were dissolved in 50 mL of tetrahydrofuran to react at room temperature for 72 hours under nitrogen. After completion of the reaction, the liquid having a low boiling point was removed by reduced pressure distillation to obtain an intermediate M. The intermediate M was dissolved in dichloromethane followed by addition of 3 mL of triethylamine, and then 0.04 mol of methacryloyl chloride was added under nitrogen to react with stirring at room temperature for 4 hours. After completion of the reaction, the liquid having a low boiling point in the reaction product was removed by reduced pressure distillation, and then the remaining triethylamine in the product was neutralized with aqueous hydrochloric acid until the pH of the product solution was neutral. The neutral solution was stood for layer separation followed by removing the water layer to obtain the vulcanizing agent B.

Chemical equation 2: synthesis route of vulcanizing agent B

3. Vulcanizing agent having the structure of formula (III)

Structural formula of the vulcanizing agent C is

The synthesis method is shown as chemical equation 3.

Synthesis of reactant: in an ice-water bath, 2 mL of newly distilled cyclopentadiene (1.6 g, 24.3 mmol) was dropwise added into n-hexane solution (100 mL) containing n-butyl lithium (24.2 mmol). The mixed solution was reacted for 3 hours at room temperature. After that, the solvent was removed from the mixed solution followed by washing the mixed solution with n-pentane (3×50 mL), and then the mixed solution was dried in vacuum to obtain Li ($C_5H_5$). At a temperature of −78° C., the above prepared Li ($C_5H_5$) was dissolved in tetrahydrofuran (75 mL), and then the mixture was dropwise added into the tetrahydrofuran solution with dimethyl vinyl chlorosilane (2.7 g, 22.0 mmol) dissolved therein to react at 0° C. for half an hour followed by reacting at room temperature overnight. The volatile components were removed from the reaction solution by vacuum distillation, and then the reaction solution was extracted with n-pentane (3×50 mL) followed by filtration and dry, and finally the reactant with a yield of 60% was obtained.

Synthesis of vulcanizing agent C: the reactant (12.0 g, 0.08 mol) was dissolved in 50 mL of tetrahydrofuran to react at room temperature for 48 hours. After completion of the reaction, the reaction solution was cooled to room temperature followed by reduced pressure distillation to obtain the vulcanizing agent C.

Chemical equation 3: synthesis route of vulcanizing agent C

4. Vulcanizing agent having the structure of formula (IV)
Structural formula of the vulcanizing agent D is

The synthesis method is shown as chemical equation 4.

Synthesis of reactant-1: under nitrogen, TMEDA (14.33 g, 0.123 mol) and 1-methylpyrrole (10 g, 0.123 mol) were dissolved in 80 mL of anhydrous tetrahydrofuran, and then 77 mL of n-hexane solution containing n-butyl lithium (1.6 M) was dropwise added to the anhydrous tetrahydrofuran to obtain a mixed solution. After stirring for half an hour, 0.123 mol of dimethyl vinyl chlorosilane was added to the mixed solution to react at room temperature for 12 hours to obtain a product solution. After washing with water, the product solution was extracted with ether followed by reduced pressure distillation to obtain the reactant-1 with a yield of 70%.

Synthesis of reactant-2: 30 g of maleic anhydride and 25 g of furan were dissolved in 300 mL of toluene with stirring at room temperature for 36 hours followed by filtration to obtain a white solid powder of furan protected maleic anhydride with a yield of 79%. 150 mL of methanol was added into a 500 mL flask with a stirrer, a constant pressure funnel and a reflux pipe. The prepared furan protected maleic anhydride (5.66 g, 34 mmol) was added into the flask and was completely dissolved with stirring. Then, at a temperature of 0° C., 50 mL of methanol with 4,4',4''-methanetriyltrianiline (1.98 g, 6.85 mmol) dissolved therein was dropwise added into the flask by the constant pressure funnel within 30 minutes. The mixed solution was reacted under reflux for 3 hours to obtain a yellow reaction mixture. The yellow reaction mixture was concentrated to 75 mL and then was crystallized at 4° C., followed by filtration to obtain light yellow crystals. The light yellow crystals were washed with 50 mL of ethyl acetate and then were dried in vacuum to obtain an intermediate M with a yield of 24%. 30 mL of toluene and the intermediate M (0.5 g, 0.85 mmol) were added into a 100 mL flask with a stirrer and a reflux pipe. The stirrer was turned on to completely dissolve the intermediate M. The mixture was reacted under condensation reflux for 7 hours to obtain a product. The product was dried in rotary dryer to obtain the reactant-2 with a yield of 84%.

Synthesis of vulcanizing agent D: the reactant-1 (4.96 g, 0.03 mol) and the reactant-2 (3.86 g, 0.01 mol) were dissolved in 50 mL of tetrahydrofuran to react at 60° C. for 48 hours under nitrogen. After completion of the reaction, the reaction solution was cooled to room temperature followed by reduced pressure distillation to remove the liquid having a low boiling point to obtain the vulcanizing agent D.

Chemical equation 4: synthesis route of vulcanizing agent D

5. Vulcanizing agent having the structure of formula (V)
Structural formula of the vulcanizing agent E:

The synthesis method is shown as chemical equation 5.

Synthesis of vulcanizing agent E: pentaerythritol tetraacrylate (3.52 g, 0.01 mol) and furfuryl alcohol (3.92 g, 0.04 mol) were dissolved in 50 mL of tetrahydrofuran to react at room temperature for 72 hours under nitrogen. After completion of the reaction, the liquid having a low boiling point was removed from the reaction solution by reduced pressure distillation to obtain an intermediate M. The intermediate M was dissolved in methylene chloride followed by addition of 3 mL of triethylamine, and 0.04 mol of methylacryloyl chloride was added under nitrogen to obtain a mixed solution. The mixed solution was reacted with stirring at room temperature for 4 hours. After completion of the reaction, the liquid having a low boiling point was removed from the solution by reduced pressure distillation, and then the remaining triethylamine in the product was neutralized with aqueous hydrochloric acid until the pH of the solution was neutral. The neutral solution was stood for layer separation followed by removing the water layer to obtain the vulcanizing agent E.

The synthesis method is shown as chemical equation 6.

Synthesis of reactant-1: furfuryl alcohol (6.43 g, 0.07 mol) was added into 20 mL of aqueous sodium hydroxide (40 wt. %) to react with stirring for 1 hour, and a reaction solution was obtained. Then, 10 mL of toluene, 5 g of 4-vinylbenzyl chloride and 4.25 g of aqueous tetrabutylammonium hydroxide (40 wt. %) were added into the reaction solution as catalysts to react at room temperature for 48 hours. After completion of the reaction, the reaction solution was added with excess water and extracted with ether. The organic phase was dried with anhydrous magnesium sulfate followed by filtration, and then the organic solvent was removed by rotary evaporation to obtain the reactant-1, with a yield of 76%.

Synthesis of reactant-2: maleic anhydride and p-vinyl aniline were dissolved in ethyl acetate to react with stirring at 0° C. for 1 hour, and a reaction solution was obtained. Then, acetic anhydride and triethylamine were added into the reaction solution to react at 55° C. for 1 hour followed by cooling to obtain the reactant-2, with a yield of 80%.

Synthesis of vulcanizing agent F: the reactant-1 (8.00 g, 0.04 mol) and the reactant-2 (7.95 g, 0.04 mol) were dissolved in 50 mL of tetrahydrofuran under nitrogen to react at 60° C. for 24 hours, and a reaction mixture was obtained. After completion of the reaction, the reaction mixture was cooled to room temperature, and then was added into excess ether to extract the organic phase. The organic phase product was subjected to reduced pressure distillation to remove the solvent. The obtained viscous liquid was the vulcanizing agent F.

Chemical equation 5: synthesis route of vulcanizing agent E

6. Vulcanizing agent having the structure of formula (VI)
Structural formula of the vulcanizing agent F:

Chemical equation 6: synthesis route of vulcanizing agent F

Embodiment 2

In parts by mass, 100 parts of polypropylene (MFR is 2.0 g/10 min, 230° C., the same below), 0.1 parts of antioxidant 1010, 0.1 parts of antioxidant 168, 0.1 parts of 2,5-dimethyl- 2,5-bis(tert-butyl peroxy)hexane (initiator), and 2 parts of the vulcanizing agent A of the present invention were mixed, and then the mixture was added to a 35-type double-screw extruder (from Coperion Keya (Nanjing) Machinery Co., Ltd.) for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 3

In parts by mass, 100 parts of polypropylene, 0.1 parts of antioxidant 1010, 0.1 parts of antioxidant 168, 0.1 parts of 2,5-dimethyl-2,5-bis(tert-butyl peroxy)hexane (initiator), and 5 parts of the vulcanizing agent A of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 4

In parts by mass, 100 parts of ethylene propylene rubber (Mooney viscosity of $ML_{1+4}$ is 40, 100° C., the same below), 0.1 parts of antioxidant 1010, 0.1 parts of antioxidant 168, 0.2 parts of dicumyl peroxide (initiator), and 5 parts of the vulcanizing agent B of the present disclosure were mixed. The mixture was added to an opening mill (X(S)K-160, produced by Shanghai Shuangying Rubber & Plastic Machinery Co., Ltd.) with a roll distance of 0.7 mm at a roll temperature of 60° C., and then the mixture was passed through the rolls and folded into a triangle bag for 5 times followed by placing for 2 hours to obtain the final product polymer.

Embodiment 5

In parts by mass, 100 parts of ethylene propylene rubber, 0.1 parts of antioxidant 1010, 0.1 parts of antioxidant 168, 0.1 parts of dicumyl peroxide (initiator), and 8 parts of the vulcanizing agent C of the present disclosure were mixed. The mixture was added to an opening mill (X(S)K-160) with a roll distance of 0.7 mm at a roll temperature of 60° C., and then the mixture was passed through the rolls and folded into a triangle bag for 5 times followed by placing for 2 hours to obtain the final product polymer.

Embodiment 6

In parts by mass, 100 parts of ethylene propylene rubber, 0.1 parts of antioxidant 1010, 0.1 parts of antioxidant 168, 0.2 parts of dicumyl peroxide (initiator), and 5 parts of the vulcanizing agent E of the present disclosure were mixed. The mixture was added to an opening mill (X(S)K-160) with a roll distance of 0.7 mm at a roll temperature of 60° C., and then the mixture was passed through the rolls and folded into a triangle for 5 times followed by placing for 2 hours to obtain the final product polymer.

Embodiment 7

In parts by mass, 50 parts of polypropylene, 50 parts of polyethylene (MFR is 3.0 g/10 min, 230° C., the same below), 0.1 parts of antioxidant 1010, 0.1 parts of antioxidant 168, 0.2 parts of 2,5-dimethyl-2,5-bis(tert-butyl peroxy)hexane (initiator), and 4 parts of the vulcanizing agent C of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 8

In parts by mass, 50 parts of polypropylene, 50 parts of polyethylene, 0.1 parts of antioxidant 1010, 0.1 parts of antioxidant 168, 0.2 parts of 2,5-dimethyl-2,5-bis(tert-butyl peroxy)hexane (initiator), and 5 parts of the vulcanizing agent D of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 9

In parts by mass, 80 parts of polypropylene, 20 parts of ethylene propylene rubber, 0.1 parts of antioxidant 1010, 0.1 parts of antioxidant 168, 0.15 parts of 2,5-dimethyl-2,5-bis(tert-butyl peroxy)hexane (initiator), and 3 parts of the vulcanizing agent D of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 10

In parts by mass, 100 parts of polyethylene, 0.1 parts of antioxidant 1010, 0.1 parts of antioxidant 168, 0.2 parts of 2,5-dimethyl-2,5-bis(tert-butyl peroxy)hexane (initiator), and 2 parts of the vulcanizing agent E of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 11

In parts by mass, 100 parts of butyl rubber (Mooney viscosity of $ML_{1+4}$ is 75, 100° C.), 0.1 parts of antioxidant 1010, 0.1 parts of antioxidant 168, 0.1 parts of dicumyl peroxide, and 5 parts of the vulcanizing agent C of the present disclosure were mixed. The mixture was added to an opening mill (X(S)K-160) with a roll distance of 0.7 mm at a roll temperature of 60° C., and then the mixture was passed through the rolls and folded into a triangle for 5 times followed by placing for 2 hours to obtain the final product polymer.

Embodiment 12

In parts by mass, 40 parts of polypropylene, 40 parts of polyethylene, 20 parts of ethylene propylene rubber, 0.1 parts of antioxidant 1010, 0.1 parts of antioxidant 168, 0.2 parts of 2,5-dimethyl-2,5-bis(tert-butyl peroxy)hexane (initiator), and 5 parts of the vulcanizing agent A of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Embodiment 13

The product polymer obtained in Embodiment 9 was again added to the 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final polymer.

Embodiment 14

The product polymer obtained in Embodiment 13 was again added to the 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final polymer.

Embodiment 15

In parts by mass, 80 parts of polypropylene, 20 parts of ethylene propylene rubber, 0.1 parts of antioxidant 1010, 0.1 parts of antioxidant 168, 0.15 parts of 2,5-dimethyl-2,5-bis (tert-butyl peroxy)hexane (initiator), and 8 parts of the vulcanizing agent F of the present disclosure were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Comparative Example 1

In parts by mass, 100 parts of polypropylene (MFR is 2.0 g/10 min, 230° C., the same below), 0.1 parts of antioxidant 1010, 0.1 parts of antioxidant 168, and 0.1 parts of 2,5-dimethyl-2,5-bis(tert-butyl peroxy)hexane (initiator) were mixed, and then the mixture was added to a 35-type double-screw extruder (from Coperion Keya (Nanjing) Machinery Co., Ltd.) for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Comparative Example 2

In parts by mass, 100 parts of ethylene propylene rubber (Mooney viscosity of $ML_{1+4}$ is 40, 100° C., the same below), 0.1 parts of antioxidant 1010, 0.1 parts of antioxidant 168, and 0.2 parts of dicumyl peroxide were mixed. The mixture was added to an opening mill (X(S)K-160 produced by Shanghai Shuangying Rubber & Plastic Machinery Co., Ltd.) with a roll distance of 0.7 mm at a roll temperature of 60° C., and then the mixture was passed through the rolls and folded into a triangle for 5 times followed by placing for 2 hours to obtain the final product polymer.

Comparative Example 3

In parts by mass, 50 parts of polypropylene, 50 parts of polyethylene (MFR is 3.0 g/10 min, 230° C., the same below), 0.1 parts of antioxidant 1010, 0.1 parts of antioxidant 168, and 0.2 parts of 2,5-dimethyl-2,5-bis(tert-butyl peroxy)hexane (initiator) were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Comparative Example 4

In parts by mass, 80 parts of polypropylene, 20 parts of ethylene propylene rubber, 0.1 parts of antioxidant 1010, 0.1 parts of antioxidant 168, and 0.15 parts of 2,5-dimethyl-2, 5-bis (tert-butyl peroxy)hexane (initiator) were mixed, and then the mixture was added to a 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Comparative Example 5

The product polymer obtained in Comparative Example 4 was again added to the 35-type double-screw extruder for melting. The melt section temperature of the extruder is 160° C., the reaction section temperature is 190° C., the melt conveying section temperature is 200° C., the outlet temperature is 180° C., and the screw speed is 150 rpm. The extruded product was cooled by circulating water bath followed by cut to obtain the final product polymer.

Performance test results of the modified polypropylene resins prepared by the above embodiments are listed in Table 1.

TABLE 1

| Embodiment | MFR or $ML_{1+4}$ | Notched impact strength (kJ/m²) 23° C. | Notched impact strength (kJ/m²) −20° C. | Flexural modulus (MPa) | Young modulus (MPa) | Tensile strength (MPa) | Elongation at break (%) |
|---|---|---|---|---|---|---|---|
| Comparative Example 1 | MFR = 2.7 (230° C.) | 2.1 | 0.55 | 1256 | 659 | 44.1 | 500 |
| Comparative Example 2 | $ML_{1+4}$ = 33 (100° C.) | / | / | / | / | 8.1 | 450 |
| Comparative Example 3 | MFR = 2.4 (230° C.) | 2.0 | 1.1 | 970 | 455 | 33.4 | 206 |
| Comparative Example 4 | MFR = 2.1 (230° C.) | 23.2 | 5.1 | 656 | 428 | 31.9 | 330 |
| Comparative Example 5 | MFR = 2.7 (230° C.) | 15.1 | 2.9 | 554 | 317 | 23.8 | 182 |
| Embodiment 2 (Compared with Comparative Example 1) | MFR = 2.5 (230° C.) | 21.8 | 2.0 | 1348 | 691 | 49.8 | 760 |
| Embodiment 3 (Compared with Comparative Example 1) | MFR = 2.3 (230° C.) | 39.4 | 3.3 | 1392 | 924 | 52.5 | 544 |
| Embodiment 4 (Compared with Comparative Example 2) | $ML_{1+4}$ = 36 (100° C.) | / | / | / | / | 16.1 | 318 |
| Embodiment 5 (Compared with Comparative Example 2) | $ML_{1+4}$ = 38 (100° C.) | / | / | / | / | 18.4 | 213 |
| Embodiment 6 (Compared with Comparative Example 2) | $ML_{1+4}$ = 37 (100° C.) | / | / | / | / | 20.6 | 89 |
| Embodiment 7 (Compared with Comparative Example 3) | MFR = 2.1 (230° C.) | 32.0 | 4.7 | 1140 | 685 | 44.2 | 358 |
| Embodiment 8 (Compared with Comparative Example 3) | MFR = 2.0 (230° C.) | 46.0 | 7.1 | 1120 | 714 | 48.7 | 227 |
| Embodiment 9 (Compared with Comparative Example 4) | MFR = 2.1 (230° C.) | Not broken | 22.8 | 710 | 555 | 37.8 | 502 |
| Embodiment 10 | MFR = 1.9 (230° C.) | Not broken | 7.8 | 1250 | 877 | 50.9 | 660 |
| Embodiment 11 | $ML_{1+4}$ = 66 (100° C.) | / | / | / | / | 20.8 | 178 |
| Embodiment 12 | MFR = 1.9 (230° C.) | Not broken | 34.7 | 910 | 487 | 35.9 | 577 |
| Embodiment 13 | MFR = 2.1 (230° C.) | Not broken | 31.5 | 866 | 520 | 34.0 | 530 |
| Embodiment 14 | MFR = 2.3 (230° C.) | Not broken | 29.2 | 882 | 505 | 33.5 | 499 |
| Embodiment 15 | MFR = 2.3 (230° C.) | Not broken | 19.5 | 774 | 681 | 40.0 | 340 |

Table 1 lists the performance data of the modified polypropylene resins.

Firstly, compared with the comparative examples, the prepared modified polymer forms a crosslinking network structure due to the addition of the vulcanizing agent of the present disclosure. It can be confirmed by the significant improvement of the mechanical performances of the modified polymers. By comparing Embodiment 2 with Comparative Example 1, Embodiment 4 with Comparative Example 2, Embodiment 7 with Comparative Example 3, and Embodiment 9 with Comparative Example 4, etc., it can be seen that the performances of material including strength and modulus are significantly improved after addition of the vulcanizing agent. It shows that the vulcanizing agent of the present disclosure plays obvious crosslinking effect.

Figure 1A:
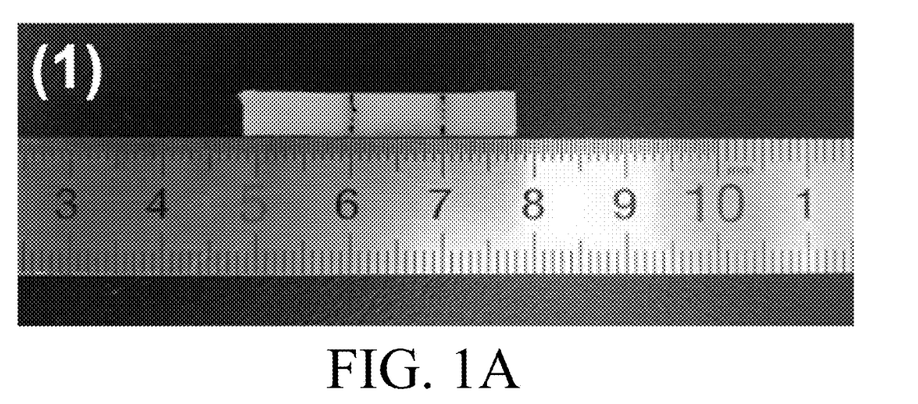
FIG. 1A shows the crosslinking rubber sample added with the vulcanizing agent of the present disclosure.
Figure 1B:
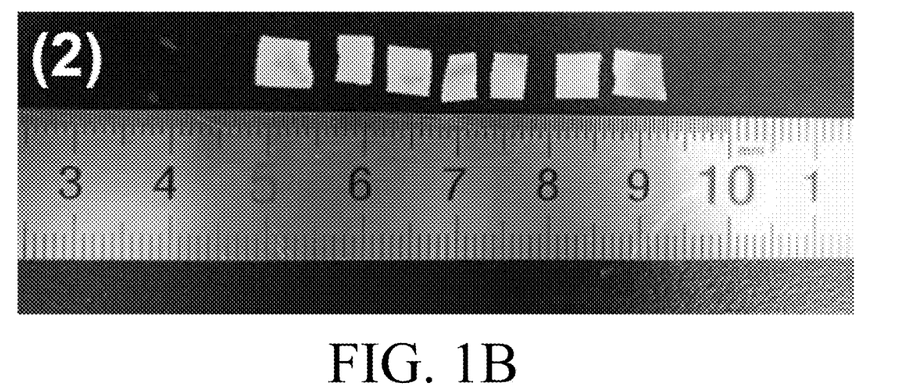
FIG. 1B shows that the crosslinking rubber sample was cut into fragments.
Figure 1C:
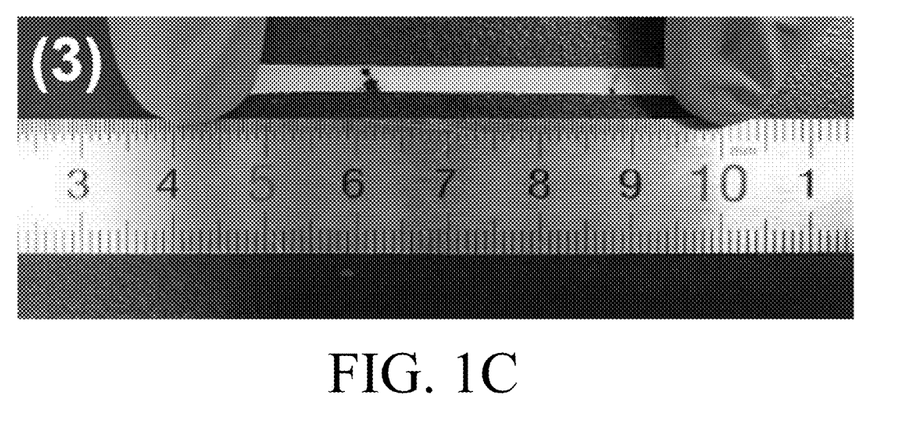
FIG. 1C shows that the properties were recovered after the fragments were processed and moulded again.

Secondly, the vulcanizing agent of the present disclosure is a new type vulcanizing agent having a reversible crosslinking function, and the prepared crosslinking polymer thereof has a thermally reversible crosslinking structure, that is, the crosslinking network can be de-crosslinked in the melt processing state (due to the reverse Diels-Alder reaction mechanism), so that enable the material to have thermoplastictiy. Melting index of the crosslinking polymer samples of all embodiments can be determined, indicating that the materials have thermoplasticity. For example, comparing Comparative Example 4 with Embodiment 9, it can be seen that the performance of polymer prepared in Embodiment 9 is significantly better than that of Comparative Example 4 due to its crosslinking structure. Meanwhile, the melt index of the two polymers is similar (that is, the processing performance is similar), indicating that the vulcanizing agent of the present disclosure has the performance of forming a network by cooling and removing the network by warming to a high temperature, which is completely different from the permanent crosslinking network formed by the traditional vulcanizing agent. The vulcanizing agent of the present disclosure enables the crosslinking polymer to have excellent property of thermoplasticity, thereby realizing the repeated processing of the crosslinking polymer. FIGS. 1A-1C show the crosslinking rubber product prepared in Embodiment 4, which can be hot-pressed again after being cut into fragments.

Thirdly, the performance of the crosslinking polymer prepared by the present disclosure can be well maintained after repeated processing. The sample of Comparative Example 5 is obtained by reprocessing the product in Comparative Example 4. It can be seen that the performance of sample of Comparative Example 5 has been obviously weakened and the strength has been reduced (one reason is that the polymer is partially degraded due to reprocessing, and another reason is that the performance is weakened due to two-phase separation). However, the sample of Embodiment 13 is obtained by reprocessing the product in Embodiment 12, and the sample of Embodiment 14 is obtained by further reprocessing the product in Embodiment 13. After continuous processing for many times, the performances of the material are hardly weakened, which is due to the thermally reversible crosslinking function of the vulcanizing agent of the present disclosure. After repeated processing, the crosslinking structure can still be stably recovered, and the crosslinking structure between the two phases can also make up the problems caused by the separation of the two phases, so that the performance can be maintained.

In conclusion, the vulcanizing agent of the present disclosure is a new type vulcanizing agent having a reversible crosslinking function. When used in polymer processing, the vulcanizing agent of the present disclosure has such characteristics as de-crosslinking at high temperature (during processing) and easy to process, and crosslinking at low temperature (after molding) and having high performance. The vulcanizing agent can also be used to strengthen the performance of waste plastics and rubber in recycling.

The invention claimed is:

1. A vulcanizing agent, comprising a compound selected from

-continued

,

2. A method for vulcanizing a polymer, comprising forming a mixture comprising a polymer, an initiator, a heat stabilizer, and the vulcanizing agent of claim 1; and heating the mixture to form a vulcanized polymer.

3. A method according to claim 2, wherein a mass ratio of the polymer to the vulcanizing agent is 100:0.01 to 100:10, a mass ratio of the polymer to the initiator is 100:0.01 to 100:1, and a mass ratio of the polymer to the heat stabilizer is 100:0 to 100:1.

4. The method according to claim 3, wherein the polymer is selected from at least one of polyolefin resins and polyolefin rubbers.

5. The method according to claim 3, wherein the initiator is selected from organic peroxides and azo initiators.

6. The method according to claim 3, wherein the heat stabilizer is selected from at least one of hindered phenolic macromolecular antioxidants, phosphite antioxidants, and alkyl ester antioxidants.

7. The method according to claim 3, further comprising:
   feeding the mixture into a reactive processing equipment to react at a temperature above 120° C.; and
   extruding the heated mixture from the reactive processing equipment to form a product; and
   cooling the product to allow crosslinking within the product.

8. The method according to claim 7, wherein the reactive processing equipment is single-screw extruder, twin-screw extruder, open mill, or internal mixer.

* * * * *